W. F. MORAN.
ROLL RELEASING MECHANISM.
APPLICATION FILED NOV. 23, 1917.
1,333,991.
Patented Mar. 16, 1920.
2 SHEETS—SHEET 1.
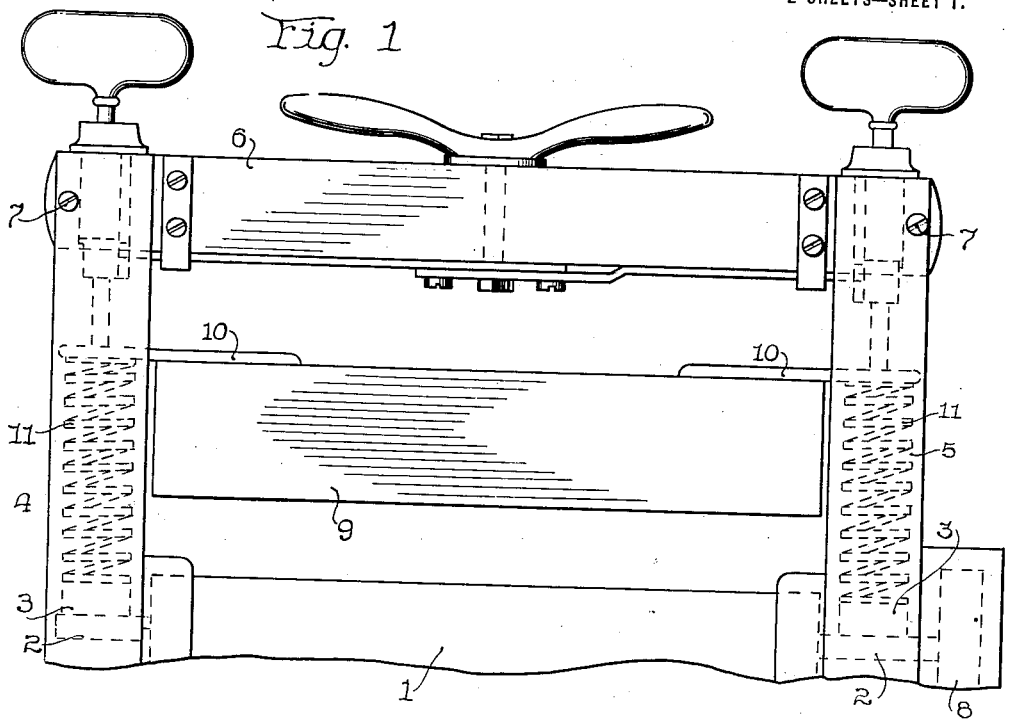
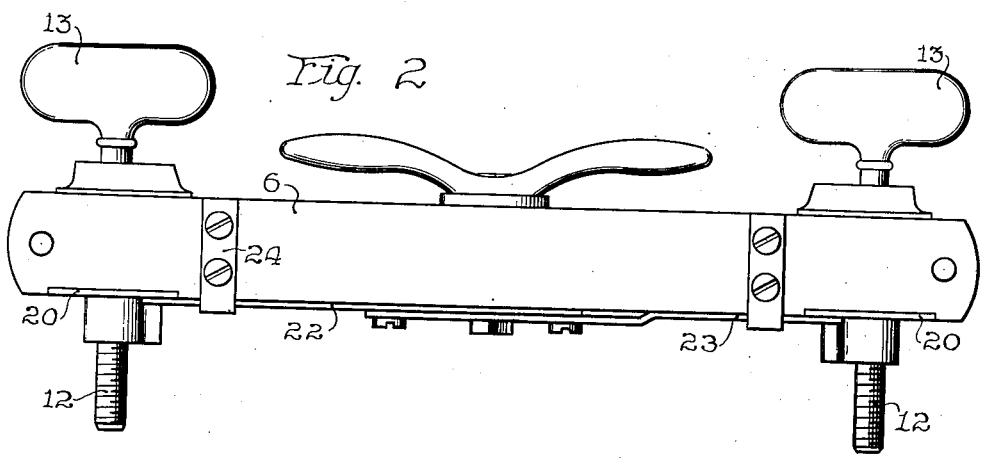
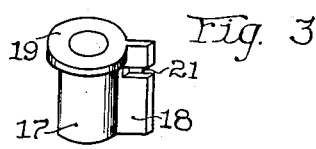
Inventor
William F. Moran
By Brown, Hanson & Boettcher
Attorneys.

W. F. MORAN.
ROLL RELEASING MECHANISM.
APPLICATION FILED NOV. 23, 1917.
1,333,991.
Patented Mar. 16, 1920.
2 SHEETS—SHEET 2.
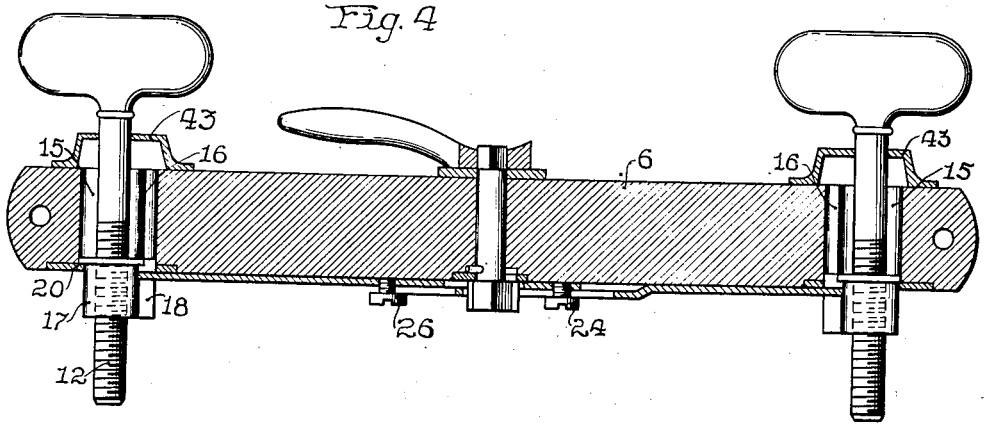
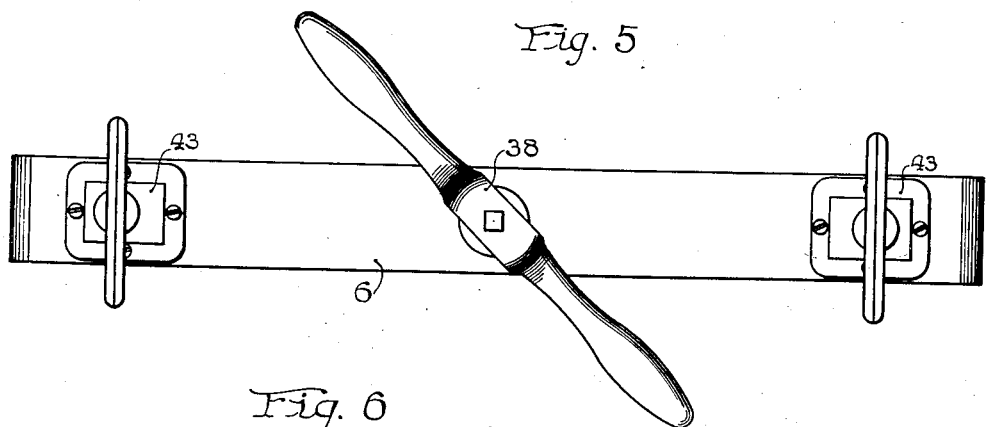
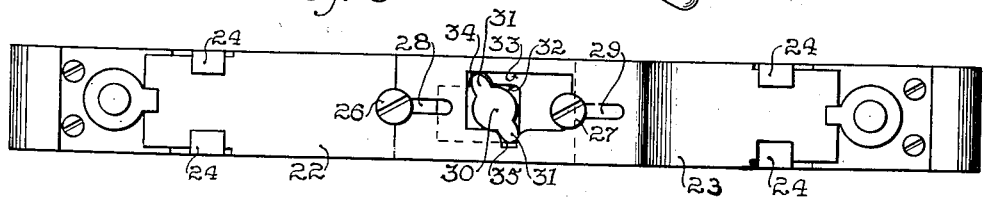
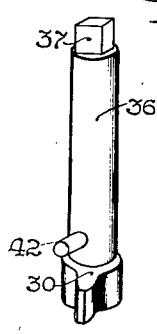
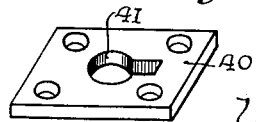
Inventor
William F. Moran
By Brown, Hanson & Boettcher
Attorneys.

UNITED STATES PATENT OFFICE.

WILLIAM F. MORAN, OF CHICAGO, ILLINOIS, ASSIGNOR TO CONLON ELECTRIC WASHER CO., OF CHICAGO, ILLINOIS, A CORPORATION OF NEW YORK.

ROLL-RELEASING MECHANISM.

1,333,991.

Specification of Letters Patent.  Patented Mar. 16, 1920.

Application filed November 23, 1917. Serial No. 203,487.

*To all whom it may concern:*

Be it known that I, WILLIAM F. MORAN, a citizen of the United States, residing at Chicago, in the county of Cook and State of Illinois, have invented a certain new and useful Improvement in Roll-Releasing Mechanism, of which the following is a full, clear, concise, and exact description, reference being had to the accompanying drawings, forming a part of this specification.

My invention relates to roll releasing mechanism.

In power operated rolls, such as are employed for wringing clothes and the like, it is highly desirable to have releasing mechanism for instantly releasing the tension on the rolls. This is necessitated by the fact that the hand of the operator may become caught or the rolls may become stalled by excessive load.

My invention provides an improved mechanism for automatically accomplishing such release.

In release devices as heretofore constructed, difficulty has been experienced in setting the rolls under tension after the release mechanism has been operated. My invention aims to make this operation as simple and convenient as possible.

A further aim of the invention is to provide a simple construction, low in cost of manufacture, easy to operate, and powerful in action.

In a particular embodiment which I have constructed, I secure those objects by setting threaded sleeves in holes in the upper crossbar.

The upper ends of the sleeves have collars which bear upon guiding plates attached to the bottom surface of the crossbars. These collars rest upon the guiding plates when the sleeves are dropped down for resetting the device. The holes in the crossbar are large enough to permit the sleeves with collars to move up and down but the holes in the guiding plates will permit only the sleeves below the collar to pass.

The holes in the crossbar are provided with key ways or grooves and the sleeves have key lugs sliding in the key-ways to permit the sleeves to be moved up and down in the holes when released and set respectively. Threaded bolts adapted for manual operation for imposing the spring tension on the rolls are threaded through the sleeves and project above the upper crossbar. The key lugs and key slots prevent the sleeves from turning when the bolts are turned.

The keys face toward each other. These keys have transverse notches cut at a point immediately below the bearing plate. Retaining plates are mounted on the under side of the crossbar with manually operable cam means for sliding the retaining plates into and out of said notches. The cam means has a vertical post projecting above the crossbar. This post is provided with a double handle lying crosswise of the upper crossbar so as to be easily accessible from any point about the device.

In order to acquaint those skilled in the art with the manner of constructing and operating an embodiment of the invention, I shall describe in detail the above construction in connection with the accompanying drawings which form a part of the present specification.

Figure 1 is a front elevation of the device above referred to shown in operative relation to a wringer roll and frame;

Fig. 2 is a front elevation of the crossbar with attached parts comprising the releasing mechanism;

Fig. 3 is an isometric view of the sleeve with the key lug and collar showing also the transverse notch adapted to receive the end of the retaining member;

Fig. 4 is a longitudinal vertical section of the device shown in Fig. 2;

Fig. 5 is a top plan view of the same;

Fig. 6 is a bottom plan view of the same;

Fig. 7 is an isometric view of the cam means and post for operating the retaining members; and Fig. 8 is an isometric view of the post-retaining plate.

The movable wringer roll 1 is provided with a shaft 2, the ends of which lie in suitable bearings 3, these bearings being guided in vertical posts 4 and 5. The vertical posts 4 and 5 comprise front and back members adapted to fit upon the front and back respectively of the cross bar 6 which is attached at the upper end of these posts by bolts 7.

The upper wringer roll 1 may be driven as by means of the gears shown in dotted lines at 8 or may idle if desired. A guiding bar 9 has extensions 10 in the form of plates at each end, these plates lying between the front and back members of the posts 4 and 5 upon the upper ends of the tensioning springs 11 shown in dotted lines in Fig. 1. The tensioning springs rest upon the bearings 3. The plates 10 which rest upon the springs 11 are engaged by the lower ends of screw bolts 12 which are provided with flat handles or wing members 14 for turning the same. These bolts are connected to the crossbar 6 by the novel mechanism now to be described. It is to be noted that the parts above set out have heretofore been employed and are known means for imposing a spring tension upon the rolls.

The crossbar 6 has vertical holes 15 through each end thereof, these holes have key slots or grooves 16 facing toward each other. Threaded sleeves 17 having key lugs 18 are movable up and down in the holes and key slots 15—16. The sleeves 17 are provided at their upper ends with collars 19, the hole 15 being sufficiently large to permit the collar 19 to slide therein freely. Flat retaining plates are set upon the lower surface of the crossbar, these retaining plates 20 having openings therein large enough to permit the main body of the sleeve 17 to pass therethrough and having key slots to permit the key lugs 18 to pass therethrough. The collar 19 rests flat upon the upper surface of the plate 20, thus holding the sleeve 17 in the proper alinement when the bolts 12 have been moved upward to reset the device.

The key lugs 18 are provided with transverse notches 21 which are so placed in the lugs 18 that they lie immediately below the retaining plates 20 when the collars 19 rest upon the upper sides of the plate 20.

Flat retaining plates 22 and 23 guided upon the lower side of the cross bar 6 are adapted to be moved into and out of the notches 21 for retaining the sleeves against the tension of the springs 11 when the bolts 12 are screwed downward. Guiding members 24 fastened on the sides of the crossbar 6 adjacent each end of the retaining members 22 and 23 serve to guide these retaining members in proper place along the bottom surface of the cross bar into the notches 21. These retaining members 24 are preferably set into the side of the crossbar so as to be flush with the surface of the same and the retaining members 22 and 23 are slightly reduced at their ends accordingly. The retaining plate 22 lies flat against the lower surface of the cross bar 6 and the member 23 overlies the end of the same and has its outer end lying flat against the bottom of the cross bar. Guidings pins or bolts 26 and 27 are fastened to the retaining plate 22 and play in slots 28 and 29 in the plate 23. Obviously this arrangement may be reversed, or other suitable guiding means provided. A double ended cam member 30, having the projecting pieces or cams 31 lies on the lower side of the cross bar 6 in suitable slots 32 and 33 in the retaining plates 22 and 23 respectively. These slots are provided with notches 34 and 35 which form followers for the cam members 31. The openings 32 and 33 are of a proper size so that when the cam member 30 is rotated the cams 31 will be forced into their corresponding notches 34 and 35, the opposite surface of the corresponding opening preventing disengagement and guiding the cams and followers in proper relation. It is apparent that instead of cutting the single notches 34 and 35, a plurality of notches might be formed to provide a rack, in which case the cam member 30 would be provided with a plurality of teeth forming a pinion.

The cam member 30 is attached to a vertical shaft or post 36, the upper end of which is squared, as shown at 37 or otherwise formed to receive the double handle member 38 which lies transverse to the cross bar 6.

In order to prevent the post 36 from dropping down, a post retaining plate 40 is set flush with the lower surface of the crossbar 6. This plate 40 has a key hole slot 41. The central part of the keyhole opening 41 is of a size to receive the post 36 and the slot thereof is adapted to permit the retaining pin 42 to pass therethrough. When the parts are in assembled position the pin 42 lies out of register with the slot in the opening 41 thereby effectually preventing longitudinal movement of the post 36.

The upper ends of the holes 15 in the crossbar 6 are closed by cap members 43 which guide the bolts 12 and which also permit the sleeve 17 to move upward into the same, permitting a greater range of movement for release.

The operation of the device is as follows:

Assuming that the parts are in the set condition shown in the figures and it is desired to release the tension upon the rolls, the handle member 38 is rotated in a counter-clockwise direction. This turns the post 36 and the cam member 30. The cams 31, engaging in the follower notches 34 and 35, withdraw retaining members or plates 22 and 23 from the notches 21 in the key members 18 on the sleeves 17, permitting the springs 11 to push the bolts 12 and the sleeves 17 up through the openings 15 in the crossbar 6.

When it is desired to reset the device, the bolts 12 are turned to move them upward in the sleeves 17 so that the sleeves may drop down upon the guiding plates 20, the collars 19 resting upon the top of these plates and the lug members 18 being guided in the key grooves 16 so that the notches 21 in the key lugs 18 come into line with the retaining members 22 and 23. The handle member 38 is then rotated in a clockwise direction to cause the retaining members 22 and 23 to enter the notches 21. The thumb bolts 12 are then screwed down to impose the required spring tension upon the rolls.

The operation of the device described is smooth and positive, and can be effected very quickly.

I do not intend to be limited to the precise details of construction shown and described.

I claim:

1. In a wringer mechanism the combination of a movable wringer roll, a spring for said roll, a fixed member having an opening therethrough, a sleeve reciprocable in said opening toward and from said roll, a member adjustably mounted in said sleeve for controlling the tension in said spring, a shoulder on said sleeve, releasable means engageable with said shoulder for releasably retaining said sleeve in one position, and means for limiting the movement of said sleeve toward such position to insure registration between said shoulder and said retaining means.

2. In a wringer mechanism the combination of a movable wringer roll, a spring for said roll, a fixed member having a keyway therethrough, a sleeve having a lug reciprocable in said keyway toward and from said roll, a screw carried by said sleeve for controlling the tension in said spring, a shoulder on said lug, releasable means engageable with said shoulder for releasably retaining said sleeve in one position, and means for limiting the movement of said sleeve toward such position to insure registration between said shoulder and said retaining means.

3. In combination, a crossbar having an opening therethrough, said opening comprising a key-groove, a threaded sleeve lying in said opening, said sleeve having a key-lug adapted to lie in said key-groove, a guiding plate on the lower surface of said cross-bar, said sleeve having a collar adapted to lie on the upper surface of said guiding plate, said key-lug having a notch therein, a retaining member adapted to engage in said notch, said member having a slot therein, said slot comprising a notch, a cam member lying in said slot, said cam member having a tooth adapted to engage in said notch, a shaft projecting through the crossbar, and a handle for operating said shaft.

4. In combination, a crossbar having an opening therethrough, said opening comprising a key-groove, a threaded sleeve lying in said opening, said sleeve having a key-lug adapted to lie in said key-groove, a guiding plate on the lower surface of said cross-bar, said sleeve having a collar adapted to lie on the upper surface of said guiding plate, said key-lug having a notch therein, a retaining member adapted to engage in said notch, said member having a slot therein, said slot comprising a notch, a cam member lying in said slot, said cam member having a tooth adapted to engage in said notch, a shaft projecting through the crossbar, and a handle for operating said shaft, a retaining plate, and means on said shaft for retaining the shaft and cam means in proper position with respect to said retaining member.

5. In combination, a crossbar having openings in each end, a threaded sleeve slidable in each opening, each sleeve having a notch, a pair of retaining members guided on the lower surface of the crossbar and adapted to move into and out of said notches, guiding means for guiding said retaining members with respect to each other, the adjoining ends of said retaining members being lapped one above the other, slots in the lapped ends of said retaining members, cam means passing through said slots and adapted to engage the edges of said slots, a shaft for operating said cam means and a handle member for operating said shaft.

6. In a wringer mechanism the combination of a movable wringer roll, a spring for said roll, a fixed member having an opening therethrough, a sleeve reciprocable in said opening toward and from said roll, a member adjustably mounted in said sleeve for controlling the tension in said spring, means coöperating with said sleeve to releasably retain said sleeve against movement, and a cap covering said opening and forming a guide for said adjustable member.

7. In combination, a crossbar having means at each end for imposing a spring tension upon the rolls, retaining members for retaining said spring tension means, a cam member for said retaining member, said retaining member and cam member lying on the lower surface of the cross bar, a shaft for the cam member projecting up through the cross bar and retaining means for said shaft for normally retaining the same in proper position in said cross bar, said retaining means permitting free removal of said shaft at a predetermined angular position of the same.

8. In combination, a frame, a pair of rolls mounted in the frame, a stationary crossbar at the top of said frame, holes in the ends of said crossbar, said holes having key grooves, sleeves having key lugs guided in said holes, retaining plates at the lower ends of said holes, said sleeves having collars adapted to be engaged by said plates, caps over the upper ends of said holes, spring means for said rolls, thumb screws passing through said caps and threading into said sleeves for tensioning said spring means, said sleeves having notches and releasable means for engaging said notches.

9. In combination, a crossbar, an opening in said crossbar, a sleeve guided in said opening, said sleeve having a notch, an engaging member comprising a plate lying on the bottom of the crossbar, a shaft passing through said crossbar, cam means on the end of the shaft, said plate having an opening, said cam means lying in said opening, and a retaining plate for the shaft, said shaft having a projection lying above said retaining plate, and normally preventing downward movement of said shaft.

10. In combination, a crossbar, an opening in said crossbar, a sleeve guided in said opening, said sleeve having a notch, an engaging member comprising a plate lying on the bottom of the crossbar, a shaft passing through said crossbar, cam means on the end of the shaft, said plate having an opening, said cam means lying in said opening, and a retaining plate for the shaft, said plate having a notch, and a projection on said shaft adapted to pass through the notch, said projection and said notch normally lying out of register.

11. In combination, a crossbar having an opening, a sleeve lying in said opening, said sleeve and opening having coöperating key means, a retaining plate at the lower side of the crossbar for holding the sleeve, said sleeve having a shoulder above the plate and a shoulder below the plate, a retaining member adapted to engage said latter shoulder, means for releasing said latter member, a cap over the opening and a thumb bolt passing through and guided in said cap and threaded into said sleeve.

In witness whereof I hereunto subscribe my name this 15th day of November, A. D. 1917.

WILLIAM F. MORAN.